United States Patent [19]

Okazaki et al.

[11] 4,385,653

[45] May 31, 1983

[54] PNEUMATIC TIRE HAVING A TREAD CONSTRUCTED OF AT LEAST TWO KINDS OF RUBBERS

[75] Inventors: Takuya Okazaki, Toyonaka; Toyohiko Asada, Nishinomiya; Masahide Nishihata, Takatsuki; Yukitoshi Morishita, Toyonaka; Keijiro Oda, Kawanishi, all of Japan

[73] Assignee: Toyo Rubber Industry Co., Ltd., Osaka, Japan

[21] Appl. No.: 211,497

[22] Filed: Dec. 1, 1980

[30] Foreign Application Priority Data

Dec. 31, 1979 [JP] Japan .................................. 54-171484

[51] Int. Cl.³ .................... B60C 1/00; B60C 11/00; B60C 11/06
[52] U.S. Cl. .............................. 152/209 R; 152/360; 152/374
[58] Field of Search ............... 152/209 R, 330 R, 360, 152/374

[56] References Cited

U.S. PATENT DOCUMENTS

| 2,224,141 | 12/1940 | Clark | 152/209 R |
| 3,364,965 | 1/1968 | Oubridge | 152/209 R |
| 4,319,620 | 3/1982 | Knill | 152/209 R |

FOREIGN PATENT DOCUMENTS 1445678 6/1966 France ............................. 152/209 R

OTHER PUBLICATIONS

"Automobile Tyres" by L. J. K. Setright, Chapman and Hall (London 1972), pp. 36-39.
"Tread Wear and Wet Skid Resistance of Butadiene-Styrene Elastomers and Blends" by Kienle, Dizon, Brett and Eckert, 44 Rubber Chemistry and Technology 996 (1971).
"Abrasion Resistance of ... Butadiene Rubber Treads" by Evstratov et al, 41 Rubber Chemistry and Technology 685 (1968).
C. M. Blow, "Rubber Technology and Manufacture", CRC Press, 1971, pp. 346-347.

Primary Examiner—Edward C. Kimlin
Assistant Examiner—Lois E. Boland
Attorney, Agent, or Firm—Flynn, Thiel, Boutell & Tanis

[57] ABSTRACT

A pneumatic radial-ply tire having a tread constructed of at least two kinds of rubber which is capable of attaining both braking performance and rolling resistance. The tread portion is constructed so that the tread center zone is comprised of a rubber having a low hysteresis loss and the tread side zones adjacent to the center zone on both sides thereof or the outer layers of them are each comprised of a rubber having a high hysteresis loss; the tread center zone and the tread side zones are disposed in parallel to each other in the circumferential direction or the tread side zones are each disposed adjoining to the tread center zone and in a superposing manner.

7 Claims, 2 Drawing Figures

PNEUMATIC TIRE HAVING A TREAD CONSTRUCTED OF AT LEAST TWO KINDS OF RUBBERS

FIELD OF THE INVENTION

This invention relates to a safe and energy-saving pneumatic tire having a low rolling resistance, good braking performance, good durability, and good high-speed performance. More particularly, it relates to a pneumatic radial-ply tire having a tread constructed of two or more kinds of rubber portions which are disposed in parallel to each other in the circumferential direction, whereby both lowering the rolling resistance and enhancing the braking performance can be satisfied simultaneously.

BACKGROUND OF THE INVENTION

With the recent demand for saving energy, car tires are required to have a small rolling resistance and a low fuel consumption.

A part of the motive energy transmitted from a car engine to the drive wheels does not act effectively, but is absorbed owing to the heat build-up of the tire, the friction between the road and the tire, etc. The energy loss due to the freely rotating wheels varies largely depending upon the construction of the tire, carcass material, etc., but is roughly estimated in terms of percentage under the following itemized causes:

Friction loss on the road surface—about 10%
Hysteresis loss of tread rubber—50–60%
Loss due to the other tire construction materials—30–40%

Seeing that the energy loss due to the hysteresis loss of a tread rubber is the largest, a decrease in the hysteresis loss might result in a tire whose energy saving effect is large and whose rolling resistance is low.

On the other hand, braking performance of a tire has a correlation with hysteresis loss of the tread rubber. In general, a rubber of low hysteresis loss has a poor braking performance, so that a low energy consumption and a good braking performance of a tire are not compatible with each other.

Since a rubber of low hysteresis loss has a good resilience, the surface of the tread comprised of such rubber, upon coming into contact with a road, conforms to the road surface texture, but is restored to its initial shape immediately when out of engagement from the road surface and becomes smooth shortly before the wheel is rotated to once again come into contact with the road. To the contrary, a rubber of high hysteresis loss has a poor resilience, so that the tread comprised of this rubber, when in contact with the road, sets its surface into a rugged pattern, which remains unrestored while the wheel is rotated one revolution. As a result, the tread surface thus deformed again comes into contact with the road in the non-smooth state, so that there occurs a great friction between the tire and the road surface, which leads to a good braking performance.

For this reason, the lowering of rolling resistance and the improvement of braking performance are, in general, not compatible with each other and are in antinomy relationship. Be that as it may, to lessen energy consumption of a tire at the sacrifice of braking performance cannot be accepted from the viewpoint of safety.

Accordingly, an essential object of this invention is to provide a pneumatic tire having both a low rolling resistance and a good braking performance.

With a view toward achieving the foregoing object, the present inventors have investigated the relationship between rolling resistance and braking performance of a tire and have found out that rolling resistance is related to the hysteresis loss of a rubber constituting the entire tread portion whereas braking performance depends largely upon the properties of a rubber constituting the surfaces of both the tread side zones where contact pressure of them upon the road is high. Hence it has turned out that the antinomy as described above can be solved substantially by constructing a tire so that both tread side zones are each comprised of a rubber having a high hysteresis loss and accordingly, a good braking performance, and the center portion of the tread is comprised of a rubber having a low hysteresis loss, whereby there is obtained a tire having a small rolling resistance and a good braking performance, from which finding the present invention has been accomplished.

SUMMARY OF THE INVENTION

Specifically stated, the essential feature of this invention resides in a pneumatic radial-ply tire comprising carcass plies fastened to a pair of bead cores at both terminals thereof, and belt plies and tread portion disposed in the top area outside the carcass, which tire is characterized in that the tread portion is constructed so that the tread center zone is comprised of a rubber having a relatively low hysteresis loss and the tread side zones joining on both sides of the tread center zone are each comprised of, at least in the outer layers thereof, a rubber having a relatively higher hysteresis loss than the rubber of the tread center zone has; the tread center zone and the tread side zones are disposed in junction in parallel to each other in the circumferential direction of the tire, or the tread side zones are each disposed adjoining to the tread center zone, in a superposing manner, thereby resulting in a tread portion which is constructed of at least two kinds of rubber.

BRIEF DESCRIPTION OF THE DRAWINGS

This invention will be hereinbelow described in more detail with reference to the accompanying drawings, in which.

DETAILED DESCRIPTION

Figure 1:
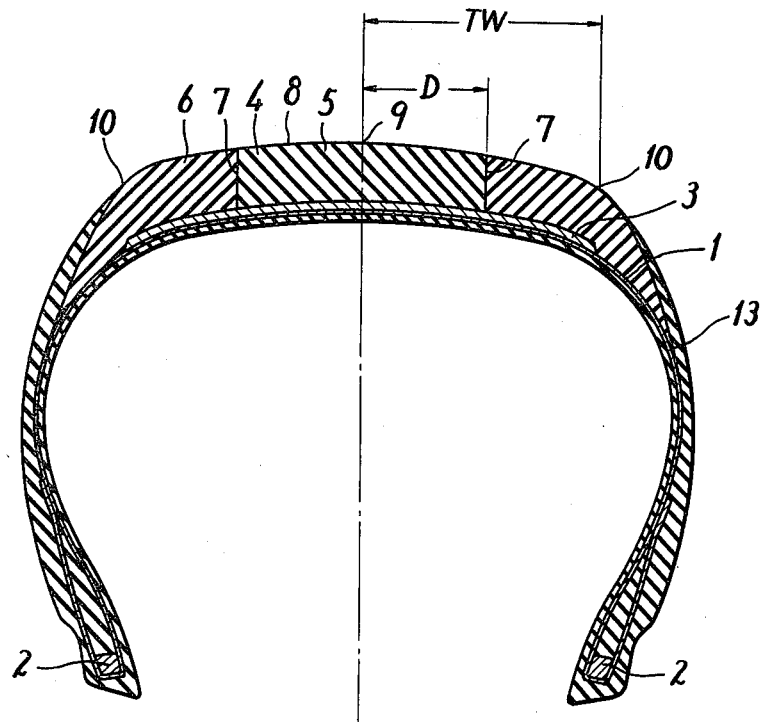
FIG. 1 is a cross-sectional view embodying one example of a pneumatic tire of this invention having a tread constructed of two kinds of rubber.

Referring to FIG. 1, carcass plies (1) are disposed at nearly a right angle with the circumferential direction with both terminals or bead regions thereof being fastened to bead cores (2). There are belt plies (3) in the top region on the outside of the carcass plies. A tread rubber (4) is located on the outside of the belt plies (3) and is divided into three zones comprising a tread center zone (5) and two tread side zones (6) joining on both sides of the tread center zone. These three zones extend in parallel to one another relative to the circumferential direction.

In one embodiment, the abutment or contact interfaces (7) between the tread center zone (5) and the tread side zones (6) each constiltute a substantially vertical or perpendicular area or plane to the rolling axis of the tire. For the tread center zone (5), a rubber of a low hysteresis loss is used while for the tread side zones (6), a rubber having a higher hysteresis loss than the rubber of the tread center zone (5) is used.

In another embodiment, the aforesaid abutment interface (7) may, otherwise, slant toward the rotation axis.

In the first mentioned embodiment, the abutment interface (7) on the tread surface (8) is positioned so that the distance from the tire equatorial line (9) to the interface is within the range of 0.5 to 0.8 times the width from the tire equatorial line (9) to the lateral edge of the tread (10).

If the position of the abutment interface approaches the equatorial line (9) below the range specified above, the large rolling resistance will be too large whereas if the abutment interface (7) approaches the lateral edge of the tread (10) above the range specified, insufficient braking performance will likely result.

Figure 2:
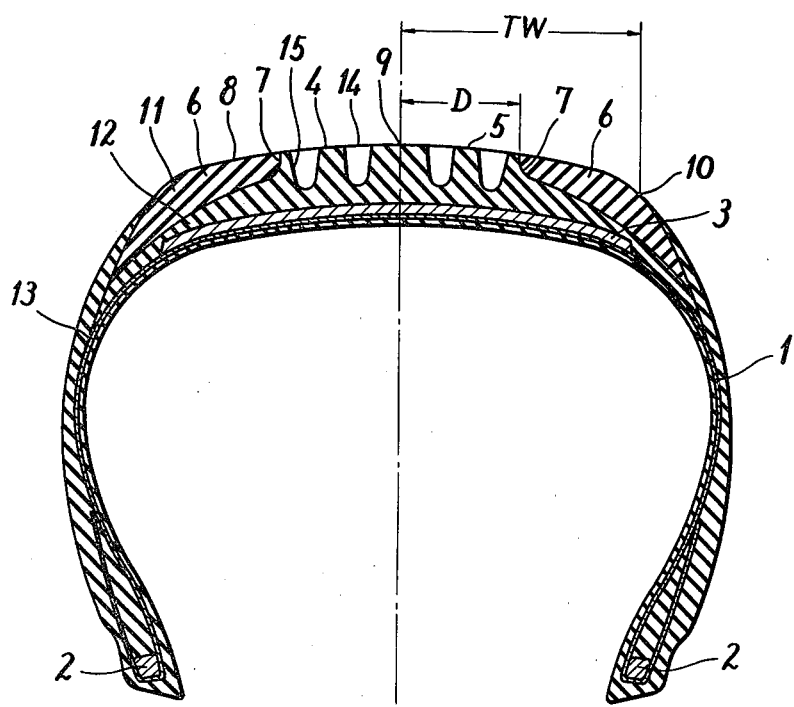
FIG. 2 is a cross-sectional view of another example of the invention tire.

In FIG. 2, the tread side zones (6) each consist of an outer layer (11) and an inner layer (12) which is comprised of the same component of rubber as that of the tread center zone (5). The abutment interface (7) between the outer layer (11) and the inner layer (12) of each tread side zone extends from the tread surface (8) axially outwardly and radially inwardly toward the vicinity of the lower or radially inner extremity (13) of the tread rubber. The outer layer (11) of the tread side zone is composed of a rubber having a higher hysteresis loss while the tread center zone (5) and the inner layer (12) of each tread side zone are composed of a rubber having a lower hysteresis loss.

Since braking performance of a tire is determined depending upon the properties of the surface (8) of the tread rubber (4), particularly the properties of the surface rubber of the tread side zone (6), it is enough that only this surface portion of the tread side zone be constructed of a rubber having a high hysteresis loss in order to improve braking performance. And where the tread center zone (5) and the inside or interior (12) of the tread side zone are comprised entirely of a rubber having a low hysteresis loss, a tire having a still lower rolling resistance is obtainable.

As a tire wears away during use, the inner portion of the tread emerges gradually on the surface. Therefore, it is a preferred embodiment to provide the outer layer (11) of the tread side zone with a sufficient thickness so that the inner layer (12) of the tread side zone (6) may not be exposed on the tread surface even when a maximum wear of the tread is reached. Stated another way, the thickness of the outer layer (11) is sufficient enough to nearly equal the maximum wear depth of a tread rubber. In this way, the use of a rubber having a low hysteresis loss for the inner layer of the tread side zone makes it possible to reduce the rolling resistance more without impairing the braking performance.

As depicted in FIG. 2, the foregoing abutment interface (7) is preferred to be located axially outward of the axially outermost groove (15) of tread grooves (14). The tread grooves (14) extend substantially circumferentially. In this case, there is no danger of a separation occurring in which the abutment interface (7) between the two rubbers might become exposed on the surface of the tread groove (14) from where the cap rubber is separated during use of the tire because the abutment interface (7) will never traverse the tread grooves (14).

A suitable rubber to be used in the pneumatic tire of this invention and having a low hysteresis loss is a rubber having a loss factor, tan $\delta$ of not more than 0.15 as measured on a dynamic viscoelastometer under the conditions of 60° C. and 11 Hz. A preferred rubber to be used in this invention and having a high hysteresis loss is a rubber having a loss factor, tan $\delta$ as defined above of not less than 0.15.

Representative compounding formulae for use as a rubber having a low hysteresis loss (A) and a rubber having a high hysteresis loss (B) both can be used for the present pneumatic tire and are compared to a conventional tread rubber (C) used alone in Table 1 herein below.

TABLE 1

|  | A | B | C |
|---|---|---|---|
| Natural Rubber | 40 | | |
| IR | 30 | | |
| SBR | | 100 | 80 |
| BR | 30 | | 20 |
| Carbon Black | 47 | 76 | 50 |
| Tan $\delta$ | 0.117 | 0.211 | 0.196 |
| Index of Rolling Resistance | 80 | 108 | 100 |
| Coefficient of Friction | 0.28 | 0.41 | 0.34 |

Each of the rubber compounds A and B contain the usual compounding agents such as sulfur, zinc oxide, vulcanization accelerator, etc. in addition to the rubber ingredient and carbon black as shown in Table 1.

The three kinds of rubber compounds are measured in regard to their loss factor, tan $\delta$ on a dynamic viscoelastometer under the conditions of a temperature of 60° C. and a frequency of vibration of 11 Hz., and the data of tan $\delta$ obtained from such measurements are shown in the table.

Tires having a size of 175 SR 14 were fabricated tentatively by the use of the respective rubber compounds to examine their tire characteristics, and the results are also shown in Table 1.

In the table, the index of rolling resistance as indicated is a relative rolling resistance which is obtained by first measuring rolling resistance on an indoor drum tester and calculating the resulting data in proportion to the datum of the conventional tire made up of Compound C when assumed to be 100. The coefficient of friction as referred to is a coefficient of friction on a wet concrete road surface which is obtained by a measurement under the conditions prescribed in UTQG (Uniform Tire Quality Grading).

In this connection, the regulation of the U.S. Transportation Department prescribes that it is most preferred that a tire should have a coefficient of friction of not less than 0.35 as a requisite essential for safety running even at a high speed.

The present invention will be further described by way of examples set forth and comparison examples hereinafter.

EXAMPLES 1, 2 AND COMPARISON EXAMPLES 1, 2

Pneumatic radial-ply tires having the sectional construction as illustrated in FIG. 1 were fabricated in a 175 SR 14 tire size in which the tread center zone (5) is composed of Rubber Compound A in Table 1 and the tread side zones (6) are each composed of Rubber Compound B in Table 1, and the position of the abutment interface (7) was varied.

They were measured in respect of index of rolling resistance and coefficient of friction on a wet road surface under the same conditions as in Table 1. The results are shown in Table 2 below.

TABLE 2

|  | Ex. 1 | Ex. 2 | Comp. Ex. 1 | Comp. Ex. 2 |
|---|---|---|---|---|
| Position of Abutment Interface (D/TW) | 0.8 | 0.5 | 0.9 | 0.3 |
| Index of Rolling Resistance | 88 | 95 | 85 | 102 |
| Coefficient of Friction | 0.35 | 0.37 | 0.32 | 0.39 |

Here, the position of an abutment interface (7) is represented in terms of a ratio of a distance (D) from the equatorial line to an abutment interface (7) to the tread width (TW) between the equatorial line and the lateral edge of the tread (10).

The tires having a D/TW ratio of 0.8 and 0.5, respectively (Ex. 1, Ex. 2) each have a lower rolling resistance than the conventional tire and a coefficient of friction of more than 0.35.

On the other hand, with the tire whose D/TW ratio is 0.9 (Comp. Ex. 1), its coefficient of friction is less than 0.35 and with the tire whose D/TW ratio is 0.3 (Comp. Ex. 2), its rolling resistance is higher than that of the conventional tire (Compound C in Table 1).

EXAMPLE 3

A pneumatic radial-ply tire having the cross-sectional construction as shown in FIG. 2 was fabricated in a 175 SR 14 tire size so that the tread center zone (5) and the inner layers (12) of the tread side zones were composed of Rubber Compound A and the outer layers (11) of the tread side zones were composed of Rubber Compound B, and that the abutment interface may be located at a position whose D/TW ratio is 0.5. Similar measurements to Example 1 were carried out, and resulted in the data:

an index of rolling resistance of 87 and
a coefficient of friction of 0.37.

Thus, a tire was developed having a lower rolling resistance and at substantially the same coefficient of friction as compared with Example 2.

As thus far described, according to the pneumatic radial-ply tire of this invention an energy-saving performance including a low rolling resistance is obtainable without impairing the braking performance, whereby two seemingly contradictory requirements for a tire can be satisfied simultaneously. Besides, there is no danger of the separation of the cap rubber occurring during tire service since each of the abutment interfaces between the two rubbers is provided radially outwardly of the tread grooves.

What is claimed is:

1. A pneumatic radial-ply tire having a tread portion constructed of at least two kinds of rubber, said tire comprising carcass plies fastened to a pair of bead cores at both edges thereof and belt plies and a tread portion disposed in the area outside the carcass, in which said tread portion is constructed so that a tread center zone is composed of a rubber having a low hysteresis loss factor (tan δ), as measured on a dynamic viscoelastomer under the conditions of 60° C. and 11 Hz, of not more than 0.15 and tread size zones extending on both sides of the tread center zone which are each composed of a rubber having a high hystersis loss factor (tan δ) of more than 0.15 as measured on a dynamic viscoelastometer under the conditions of 60° C. and 11 Hz; the tread center zone and the tread side zones are, in their interfaces, defined vertically in parallel to one another in the circumferential direction; and the interfaces on the tread surface are each located so that the distance between them is within the range of 0.5 to 0.8 times the overall tread width.

2. A pneumatic radial-ply tire having a tread constructed of at least two kinds of rubber portions as claimed in claim 1, wherein said interfaces each extend at a nearly perpendicular angle to the tread surface.

3. A pneumatic radial-ply tire having a tread portion constructed of at least two kinds of rubber, said tire comprising carcass plies fastened to a pair of bead cores at both edges thereof and belt plies and a tread portion disposed in the area outside the carcass, in which said tread portion is constructed so that a tread center zone is composed of a rubber having a low hysteresis loss factor (tan δ), as measured on a dynamic viscoelastometer under the conditions of 60° C. and 11 Hz, of not more than 0.15 and tread side zones extending on both sides of the tread center zone which are each composed of a rubber having a high hysteresis loss factor (tan δ) of more than 0.15 measured on a dynamic viscoelastometer under the conditions of 60° C. and 11 Hz; the tread center zone is laterally prolonged and extends through the interfaces between the tread center zone and the tread side zones and beneath the tread side zones in a gradually diminished thickness and each of the tread side zones is superposed on the laterally prolonged portion of the tread center zone; and the interfacial positions on the tread surface are each located so that the distance between them is within the range of 0.5 to 0.8 times the overall tread width.

4. A pneumatic radial-ply tire having a tread constructed of at least two kinds of rubber as claimed in claim 3, wherein said tread side zones each consist of an outer layer which is comprised of a rubber having a first hysteresis loss value and an inner layer which is comprised of a rubber having a second hysteresis loss value less than said first hysteresis loss value.

5. A pneumatic radial-ply tire having a tread constructed of at least two kinds of rubber as claimed in claim 4, wherein said tread side zones each consist of said outer layer which is comprised of a rubber having said first hysteresis loss greater than the rubber of the tread center zone and said inner layer extends into said tread side zone and which is comprised of the same rubber as said tread center zone.

6. A pneumatic radial-ply tire having a tread constructed of at least two kinds of rubber as claimed in claim 4, wherein said interfaces between said tread center zone and said outer layers of said tread side zones are each located axially outward of an axially outermost tread groove extending in a substantially circumferential direction.

7. A pneumatic radial-ply tire having a tread constructed of at least two kinds of rubber as claimed in claim 4, wherein said rubber having said first hysteresis loss has a loss factor, tan δ as measured on a dynamic viscoelastometer under the conditions of 60° C. and 11 Hz of not less than 0.15 and said rubber of said second hysteresis loss has a loss factor, tan δ of not more than 0.15 as measured on a dynamic viscoelastometer under the conditions of 60° C. and 11 Hz.

* * * * *

UNITED STATES PATENT AND TRADEMARK OFFICE
CERTIFICATE OF CORRECTION

PATENT NO. : 4 385 653
DATED : May 31, 1983
INVENTOR(S) : Takuya OKAZAKI et al

It is certified that error appears in the above-identified patent and that said Letters Patent is hereby corrected as shown below:

Col. 5, line 60; change "viscoelastomer" to
---viscoelastometer---.

Col. 5, line 64; change "hystersis" to ---hysteresis---.

Signed and Sealed this

Thirtieth Day of August 1983

[SEAL]

Attest:

GERALD J. MOSSINGHOFF

Attesting Officer

Commissioner of Patents and Trademarks